Feb. 19, 1957  W. SWALLOW  2,781,917
LIQUID FILTERS
Filed March 23, 1954  2 Sheets-Sheet 1
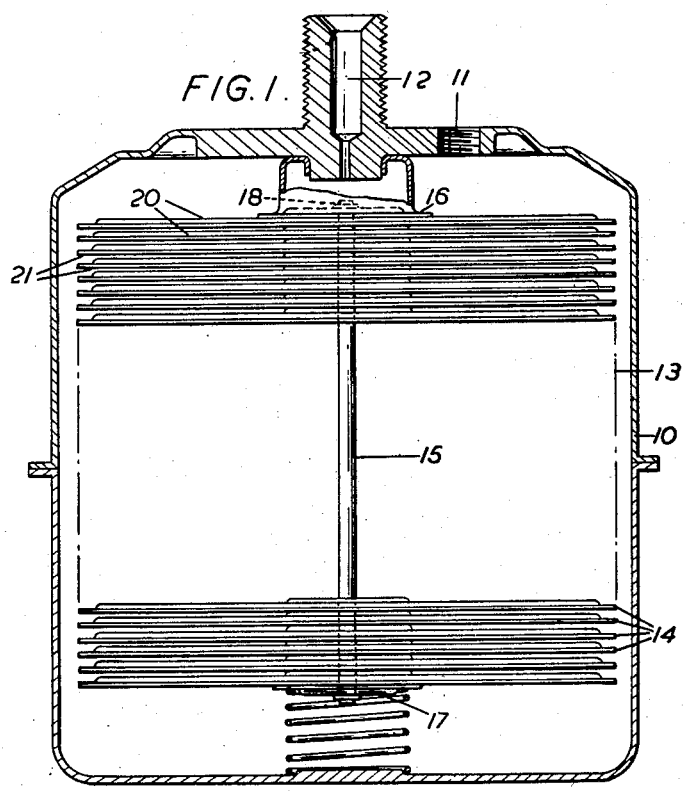
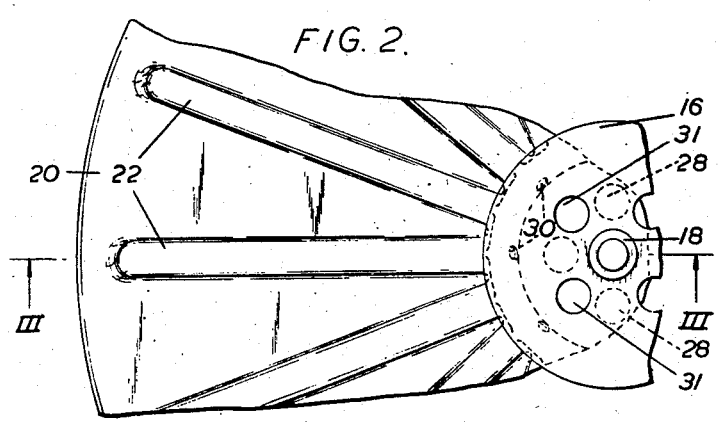
Inventor
William Swallow
By
J. E. Jones
Attorney

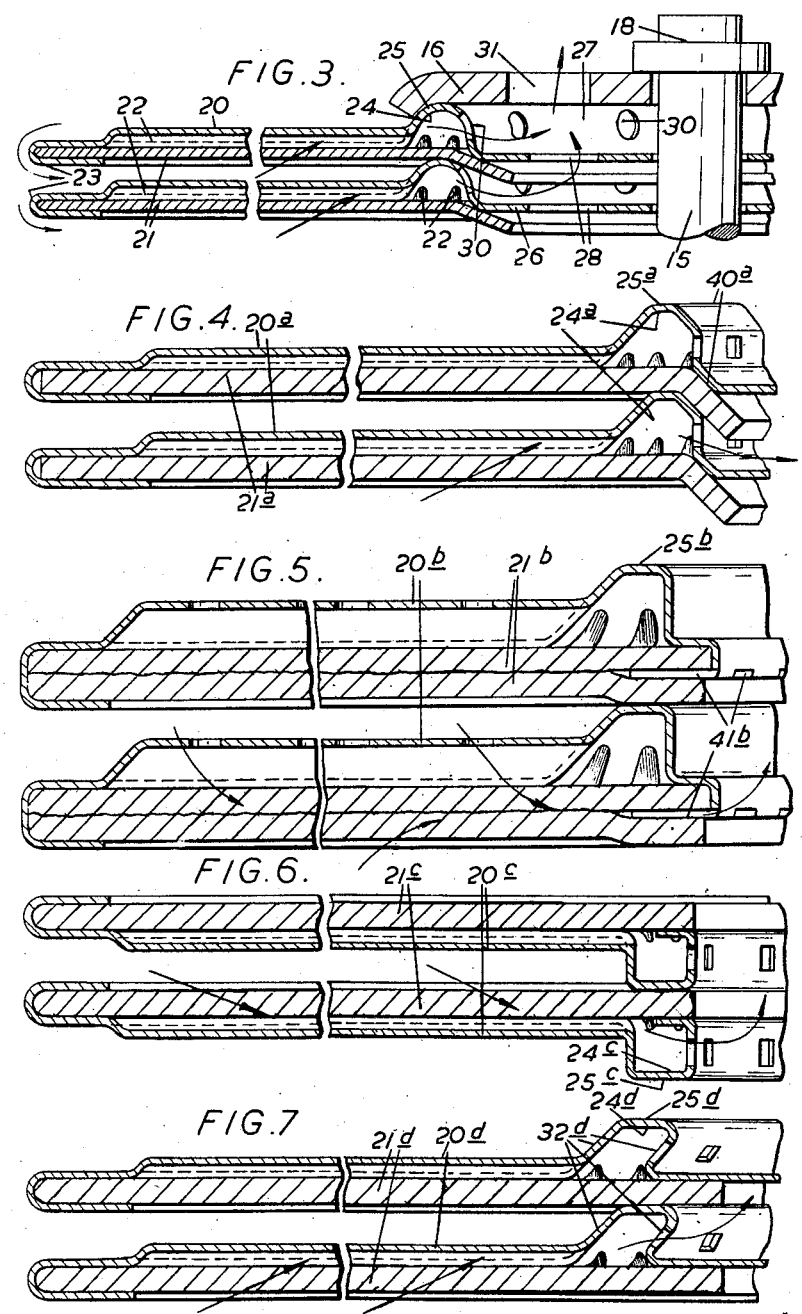

United States Patent Office 2,781,917
Patented Feb. 19, 1957

2,781,917

LIQUID FILTERS

William Swallow, London, England, assignor to General Motors Corporation, Detroit, Mich., a corporation of Delaware Application March 23, 1954, Serial No. 418,045

Claims priority, application Great Britain April 1, 1953

2 Claims. (Cl. 210—178)

This invention relates to the filtration of fluids and is particularly concerned with filters, for that purpose, incorporating sheet filter material.

Filters according to this invention are of particular utility for filtering oil used in lubricating internal combustion engines.

The object of this invention is to provide an improved filter or a filter unit in which there is no need to use sheet material which is unnecessarily robust and strong for filtration purposes, merely to withstand the necessary handling in the manufacture of the filter: all that is required is that the sheet material shall be sufficiently permeable to effect efficient filtration to the required degree.

A further object of the invention is to make each filter element forming the filter unit of the filter of a sheet of permeable material which is supported against flexure over the major part of its area by a sheet of non-permeable material, such that the filtrate can pass between the adjacent surfaces, the two sheets of each element being in fluid-sealing relationship around their outer peripheries and the inner peripheral part of the non-permeable sheet of each element being formed with a groove to space the elements from one another.

The groove in the non-permeable element can be, for example, of square or round cross-section and is such that the corresponding ridge on its opposite face acts as a clamp against the inner periphery of the sheet of permeable material of the adjacent element.

The fluid sealing relationship of the outer peripheries of the two sheets of each element can be obtained by a mechanical seal or by having the peripheries abutting so that fluid pressure causes a seal.

The shape of the sheets can be varied according to requirements: they can be of circular or elliptical annular form, or polygonal, square or rectangular for example.

At the inner periphery of the non-permeable sheet there can be one or more holes for the passage of filtrate after it has passed between the adjacent surfaces of the two sheets of each element.

The surface of the non-permeable sheet can be indented or grooved, either linearly or discretely, to facilitate the inter-surface flow of filtrate, subject to sufficient support against flexure of the permeable sheet. If the area of the unsupported part were made too large there would be liability to excessive flexure and consequent puncture. As an alternative or a supplement to such indentation or grooving, the permeable material can itself be so formed.

To make a filter unit, several elements are stacked successively on top of one another; for example on a central rod or tube or like support, the arrangement being such that the filtrate passes towards the centre of the unit, and thence to the outlet. Alternatively the filter elements could be stacked within a tube such as a perforated metal container.

Elements of different permeabilities can be made, to effect fine or intermediate or coarse filtering; and elements of much different permeabilities can be stacked or used together to effect varied filtration simultaneously.

The materials of the sheets are preferably sheet metal such as aluminium or template and paper respectively. The paper can be impregnated, as with a resin. The paper can, as indicated above, be indentated or grooved, or it can be creped.

Further objects and advantages of the invention will be apparent from the following description, reference being had to the accompanying drawings wherein preferred forms of embodiments of the invention are clearly shown.

In the drawings:

Fig. 1 is an elevation in part in section of an oil filter embodying a filter unit according to the invention;

Fig. 2 is a part plan of a filter element;

Fig. 3 is an enlarged elevation, partly in section on line III—III of Fig. 2 of part of the filter unit showing the details of construction of the filter element; and Figs. 4, 5 and 6 and 7 are part sections through the modified filter element.

In Fig. 1 is shown an oil filter which comprises an outer casing 10 having an oil inlet 11 and an oil outlet 12. Within the casing 10 is a filter unit 13 formed of a plurality of filter elements 14 stacked on a central longitudinal supporting rod 15 and compressed between a top clamp 16 and a bottom clamp 17. A retaining stud 18 (Fig. 2) is riveted on to rod 15 while the elements 14 are under slight compression so that the elements 14, rod 15, clamps 16 and 17 and stud 18 form the removable filter unit 13.

Each element 14 consists of an annular aluminium sheet 20 (Figs. 2 and 3) and an annular resin impregnated sheet 21. In the surface of the aluminium sheet 20 are formed spaced radial indentations or grooves 22. The outer peripheries of the sheets 20 and 21 are united by crimping sheet 20 over sheet 21 as at 23. Adjacent the inner periphery of sheet 21 the sheet 20 is formed with a groove 24 of substantially semicircular cross section, the ridge 25 corresponding to which serves to space the sheets 21 and, being under compression, to clamp and seal adjacent elements 14 to one another.

Each sheet 20 has an inward extension 26 which spaces each element 14 from the rod 15. Between adjacent extensions 26 is an annular space 27, the spaces 27 being connected by apertures 28 to form a central longitudinal channel for oil flow. The grooves 22 between the sheets 20 and 21 are connected to the spaces 27 by apertures 30 and apertures 31 connect the spaces 27 to the oil outlet 12.

As is shown by the arrows in Fig. 3 oil entering the inlet 11 flows radially into the spaces between adjacent elements 14, through the sheets 21 into the grooves 22, radially inwardly through the groove 22 and apertures 30 into spaces 27, and longitudinally through apertures 28, spaces 27 and apertures 31 to oil outlet 12. Oil entering at inlet 11 exerts pressure against the opposed surfaces of each element 14 and insures the sealing together of the outer peripheries of the sheets constituting such element. Foreign particles are therefore excluded from the radial channels or grooves 22 and the outlet 12.

In Fig. 4 is shown a modified form of filter element having an annular metal sheet 20a and an annular paper sheet 21a. In this modification groove 24a and ridge 25a are formed with a number of flat surfaces 40a which assist the clamping action of the ridge 25a.

In Fig. 5 is shown a further modified form of filter element having a single perforated annular metal sheet 20b and a double annular paper sheet 21b. The ridge 25b is flat and the sheet 20b extends around one of the sheets 21b and has tongues 41b which separate the sheets 21b.

The direction of flow of oil through the element is shown by the arrows.

In Fig. 6 is shown a further modified form of filter element having an annular metal sheet 20c and an annular paper sheet 21c. The groove 24c is of square cross-section and the ridge 25c is flat.

In Fig. 7 is shown a further modified form of filter element having an annular metal sheet 20d and an annular paper sheet 21d. The groove 24d has sloping walls 32d and the ridge 25d is flat.

To make the filter shown in Figs. 1 and 3, resin-impregnated paper of a thickness dependent in the nature of the fluid to be filtered but usually of the order of .015" to 0.20" and preferably .020", is cut into annular sheets 21. A number of thin metal annular sheets 20 of about .005" thickness are similarly formed, and each is stamped with the radial grooves 22 and with a circular groove 24 around its inner periphery to form a manifold for the radial grooves which communicate with it. The inner groove is then apertured at spaced intervals.

To assemble a filter element, a paper annular sheet 21 is placed on the grooved side of a metal annular sheet 20, and the outer edge of the metal annular sheet 20 is crimped over and around the outer edge of the paper annular sheet 21 to hold it.

A stack of elements 14 is then built up to form a filter unit 13 on a central rod 15, such that the inner circular ridges 25 of all but the topmost element 14 engage the inner edges of the paper annular sheets 21 of the adjacent elements 14 and clamp them against their respective metal annular sheets 20. Top and bottom clamps 16 and 17 and retaining stud 18 complete the assembly.

The filter can have the usual by-pass valve; and is formed as a sealed replaceable unit. Alternatively the casing can be operable and the filter element replaceable.

Instead of paper, fabric, porous metal or like sheet metal material can be used. Instead of metal, stiff impregnated board, plastic or like material can be used.

In the manufacture and assembly of such a filter unit the permeable sheet material is not folded or bent in any way. There is maximum filtering area and optimum sludge capacity, with constant clearance for sludge over the entire filter media.

While the embodiments of the invention as herein disclosed constitute preferred forms, it is to be understood that other forms can be adopted coming within the scope of the claims.

What is claimed is as follows:

1. A filter unit enclosed in a casing having an inlet aperture and an outlet aperture, said unit comprising a plurality of filter elements arranged in a stack, means holding said stack in assembled relation, said elements being formed with openings defining a passage leading through the stack and communicating with one of said apertures, each of said elements being preformed as an integral structure prior to stacking and including a sheet of permeable material and a relatively rigid sheet attached in sealed relation at their peripheries, said rigid sheet having interconnecting grooves communicating with said sheet of permeable material, one of said grooves being defined by a ridge formed in said rigid sheet and surrounding said passage and presenting an annular shoulder contacting the permeable material of one adjacent element, said rigid sheet having at least one opening whereby fluid may flow between said one groove and said passage, and a continuous surface on said rigid sheet contacting the permeable sheet of its element to clamp it against the annular shoulder of another adjacent element to maintain a seal around said main passage.

2. A filter unit comprising a plurality of filter elements, means holding said elements together in the form of a stack, said elements being formed with openings defining a passage leading through the stack, each of said elements including a sheet of permeable material and a relatively rigid sheet, said rigid sheet being crimped around the margin of said permeable material to form a peripheral seal, said rigid sheet having ridges defining interconnecting grooves and at least one opening placing said grooves in communication with said passage, one of said ridges surrounding said passage and constituting a spacing means between said one element of which it is a part and an adjacent element in said stack, an annular shoulder and a continuous surface coaxially formed on said rigid sheet about said passage, and the annular shoulder on said one element contacting the permeable sheet of the said adjacent element to clamp it against the continuous surface of the latter to maintain a seal.

References Cited in the file of this patent

UNITED STATES PATENTS

| | | |
|---|---|---|
| 893,360 | Paul | July 14, 1908 |
| 1,229,755 | Kilby | June 12, 1917 |
| 1,750,185 | McGeehan et al. | Mar. 11, 1930 |
| 2,077,999 | Hurn | Apr. 20, 1937 |
| 2,278,453 | Kracklauer | Apr. 17, 1942 |
| 2,304,618 | Williams | Dec. 8, 1942 |
| 2,345,014 | Stamsvik | Mar. 28, 1944 |
| 2,592,849 | Balley | Apr. 15, 1952 |
| 2,597,235 | Ericson | May 20, 1952 |